United States Patent
Homewood et al.

(10) Patent No.: US 6,807,628 B2
(45) Date of Patent: Oct. 19, 2004

(54) SYSTEM AND METHOD FOR SUPPORTING PRECISE EXCEPTIONS IN A DATA PROCESSOR HAVING A CLUSTERED ARCHITECTURE

(75) Inventors: Mark Owen Homewood, Winscombe (GB); Anthony X. Jarvis, Acton, MA (US); Alexander J. Starr, Acton, MA (US)

(73) Assignee: STMicroelectronics, Inc., Carrollton, TX (US)

( * ) Notice: Subject to any disclaimer, the term of this patent is extended or adjusted under 35 U.S.C. 154(b) by 638 days.

(21) Appl. No.: 09/751,330

(22) Filed: Dec. 29, 2000

(65) Prior Publication Data

US 2002/0124163 A1 Sep. 5, 2002

(51) Int. Cl.[7] .............................. G06F 9/38; G06F 11/00
(52) U.S. Cl. .......................................... 712/244; 712/24
(58) Field of Search ........................... 712/244, 24, 23, 712/28, 32

(56) References Cited

U.S. PATENT DOCUMENTS

| | | | |
|---|---|---|---|
| 5,297,263 A | * | 3/1994 | Ohtsuka et al. ............. 712/244 |
| 5,404,557 A | | 4/1995 | Yamashita |
| 6,125,443 A | | 9/2000 | Takahashi |
| 6,615,338 B1 | * | 9/2003 | Joy et al. .................... 712/24 |

FOREIGN PATENT DOCUMENTS

WO    WO 99/04334    1/1999

OTHER PUBLICATIONS a. Dale et al., IBM Tech. Disclosure Bulletin, vol. 24, No. 11A, Apr. 1982, XP–000955214.*
b. J. Smith et al.,"Implementation of Precise Interrupts in Pipelined Processors", Proc. 12th Annual Int. Symp. On Comp. Arch., 1985, pp. 36–44.*
c. Ullah et al. "The MC881100 Implementation of Precise Exceptions in a Superscalar Architecture", Computer Architecture News, vol. 21, No. 1, 1993, pp. 15–25.*
e. Faraboshi et al. "Lx: A Technology Platform for Customizable VLIW Embedded Processing", In Proc. of the 27th Int. Symp. on Computer Architecture, pp. 203–213, Jun. 2000.*

* cited by examiner

Primary Examiner—Henry W. H. Tsai
(74) Attorney, Agent, or Firm—Lisa K. Jorgenson; William A. Munck (57) ABSTRACT

There is disclosed a data processor having a clustered architecture that comprises a plurality of clusters and an interrupt and exception controller. Each of the clusters comprises an instruction execution pipeline having N processing stages. Each of the N processing stages is capable of performing at least one of a plurality of execution steps associated with instructions being executed by the clusters. The interrupt and exception controller operates to (i) detect an exception condition associated with one of the executing instructions, wherein this executing instruction issued at time $t_0$, and (ii) generate an exception in response to the exception condition upon completed execution of earlier ones of the executing instructions, these earlier executing instructions issued at time preceding $t_0$.

24 Claims, 4 Drawing Sheets

SYSTEM AND METHOD FOR SUPPORTING PRECISE EXCEPTIONS IN A DATA PROCESSOR HAVING A CLUSTERED ARCHITECTURE

CROSS-REFERENCE TO RELATED APPLICATIONS

The present invention is related to those disclosed in the following United States Patent Applications:

1) Ser. No. 09/751,372, filed concurrently herewith, entitled "SYSTEM AND METHOD FOR EXECUTING VARIABLE LATENCY LOAD OPERATIONS IN A DATA PROCESSOR";
2) Ser. No. 09/751,331, filed concurrently herewith, entitled "PROCESSOR PIPELINE STALL APPARATUS AND METHOD OF OPERATION";
3) Ser. No. 09/751,371, filed concurrently herewith, entitled "CIRCUIT AND METHOD FOR HARDWARE-ASSISTED SOFTWARE FLUSHING OF DATA AND INSTRUCTION CACHES";
4) Ser. No. 09/751,327, filed concurrently herewith, entitled "CIRCUIT AND METHOD FOR SUPPORTING MISALIGNED ACCESSES IN THE PRESENCE OF SPECULATIVE LOAD INSTRUCTIONS";
5) Ser. No. 09/751,388, filed concurrently herewith, entitled "BYPASS CIRCUITRY FOR USE N A PIPELINED PROCESSOR";
6) Ser. No. 09/751,410, filed concurrently herewith, entitled "SYSTEM AND METHOD FOR EXECUTING CONDITIONAL BRANCH INSTRUCTIONS IN A DATA PROCESSOR";
7) Ser. No. 09/751,330, filed concurrently herewith, entitled "SYSTEM AND METHOD FOR ENCODING CONSTANT OPERANDS IN A WIDE ISSUE PROCESSOR";
8) Ser. No. 09/751,674, filed concurrently herewith, entitled "CIRCUIT AND METHOD FOR INSTRUCTION COMPRESSION AND DISPERSAL IN WIDE-ISSUE PROCESSORS";
9) Ser. No. 09/751,678, filed concurrently herewith, entitled "SYSTEM AND METHOD FOR REDUCING POWER CONSUMPTION IN A DATA PROCESSOR HAVING A CLUSTERED ARCHITECTURE"; and
10) Ser. No. 09/751,679, filed concurrently herewith, entitled "INSTRUCTION FETCH APPARATUS FOR WIDE ISSUE PROCESSORS AND METHOD OF OPERATION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is generally directed to data processors and, more specifically, to systems and methods for supporting precise exceptions in a data processor having a clustered architecture.

BACKGROUND OF THE INVENTION

The demand for high performance computers requires that state-of-the-art microprocessors execute instructions in the minimum amount of time. A number of different approaches have been taken to decrease instruction execution time, thereby increasing processor throughput. One way to increase processor throughput is to use a pipeline architecture in which the processor is divided into separate processing stages that form the pipeline. Instructions are broken down into elemental steps that are executed in different stages in an assembly line fashion.

A pipelined processor is capable of executing several different machine instructions concurrently. This is accomplished by breaking down the processing steps for each instruction into several discrete processing phases, each of which is executed by a separate pipeline stage. Hence, each instruction must pass sequentially through each pipeline stage in order to complete its execution. In general, a given instruction is processed by only one pipeline stage at a time, with one clock cycle being required for each stage. Since instructions use the pipeline stages in the same order and typically only stay in each stage for a single clock cycle, an N stage pipeline is capable of simultaneously processing N instructions. When filled with instructions, a processor with N pipeline stages completes one instruction each clock cycle.

The execution rate of an N-stage pipeline processor is theoretically N times faster than an equivalent non-pipelined processor. A non-pipelined processor is a processor that completes execution of one instruction before proceeding to the next instruction. Typically, pipeline overheads and other factors decrease somewhat the execution advantage rate that a pipelined processor has over a non-pipelined processor.

An exemplary seven stage processor pipeline may consist of an address generation stage, an instruction fetch stage, a decode stage, a read stage, a pair of execution (E1 and E2) stages, and a write (or write-back) stage. In addition, the processor may have an instruction cache that stores program instructions for execution, a data cache that temporarily stores data operands that otherwise are stored in processor memory, and a register file that also temporarily stores data operands.

The address generation stage generates the address of the next instruction to be fetched from the instruction cache. The instruction fetch stage fetches an instruction for execution from the instruction cache and stores the fetched instruction in an instruction buffer. The decode stage takes the instruction from the instruction buffer and decodes the instruction into a set of signals that can be directly used for executing subsequent pipeline stages. The read stage fetches required operands from the data cache or registers in the register file. The E1 and E2 stages perform the actual program operation (e.g., add, multiply, divide, and the like) on the operands fetched by the read stage and generates the result. The write stage then writes the result generated by the E1 and E2 stages back into the data cache or the register file.

Assuming that each pipeline stage completes its operation in one clock cycle, the exemplary seven stage processor pipeline takes seven clock cycles to process one instruction. As previously described, once the pipeline is full, an instruction can theoretically be completed every clock cycle.

The throughput of a processor also is affected by the size of the instruction set executed by the processor and the resulting complexity of the instruction decoder. Large instruction sets require large, complex decoders in order to maintain a high processor throughput. However, large complex decoders tend to increase power dissipation, die size and the cost of the processor. The throughput of a processor also may be affected by other factors, such as exception handling, data and instruction cache sizes, multiple parallel instruction pipelines, and the like. All of these factors increase or at least maintain processor throughput by means of complex and/or redundant circuitry that simultaneously increases power dissipation, die size and cost.

In many processor applications, the increased cost, increased power dissipation, and increased die size are tolerable, such as in personal computers and network servers that use x86-based processors. These types of processors include, for example, Intel Pentium™ processors and AMD Athlon™ processors.

However, in many applications it is essential to minimize the size, cost, and power requirements of a data processor. This has led to the development of processors that are optimized to meet particular size, cost and/or power limits. For example, the recently developed Transmeta Crusoe™ processor reduces the amount of power consumed by the processor when executing most x86 based programs. This is particularly useful in laptop computer applications. Other types of data processors may be optimized for use in consumer appliances (e.g., televisions, video players, radios, digital music players, and the like) and office equipment (e.g., printers, copiers, fax machines, telephone systems, and other peripheral devices).

In general, an important design objective for data processors used in consumer appliances and office equipment is the minimization of cost and complexity of the data processor. One way to minimize cost and complexity is to exclude from the processor core functions that can be implemented with memory-mapped peripherals external to the core. For example, cache flushing may be performed using a small memory-mapped device controlled by a specialized software function. The cost and complexity of a data processor may be minimized by implementing extremely simple exception behavior in the processor core.

Exceptions are interrupts produced by the data processor itself. The cause of an exception is generally an internal processor error. Exceptions are commonly distinguished as one of faults (i.e., issues an exception prior to completing instruction execution), traps (i.e., issues an exception after completing instruction execution) and aborts (i.e., unlike faults and traps, does not always indicate an address of the error, therefore recovering instruction execution after an abort is not always possible).

A wide-issue processor is a pipelined data processor well-suited for use in consumer appliances and office equipment. A wide-issue processor operates to execute bundles of operations in multiple stages—multiple concurrent operations are bundled into a single instruction and are issued and executed as a unit. In a wide-issue processor, having a clustered architecture, data processor resources are further divided into clusters wherein each cluster consists of one or more register files each of which is associated with a subset of the execution units of the data processor.

Conventionally, an exception will cause the wide-issue processor to enter immediately into an excepting state where it will wait until activity for a given set of instructions or operations has completed. Hardware for partial re-execution of the interrupted instruction bundles is often employed for "cleanup." A primary disadvantage is found in the time expended waiting for the processor to "cleanup" and to determine its state. This has a related disadvantage of requiring complex hardware logic to handle instruction re-execution. An alternate approach does not provide support for certain precise exception conditions, meaning that some combinations of operations are not allowed. A primary disadvantage is found in limiting legal code combinations.

Therefore, there is a need in the art for improved data processors in which the cost and complexity of the processor core is minimized while maintaining the processor throughput. In particular, there is a need for improved systems and methods for supporting precise exceptions in a wide-issue data processor. More particularly, there is a need for systems and methods capable of identifying a precise exception early in a pipeline and efficiently completing operations previously executing in the pipeline, thereby addressing wasted power/time resources associated with prior art implementations.

SUMMARY OF THE INVENTION

To address the above-discussed deficiencies of the prior art, it is a primary object of the present invention to provide a data processor having a clustered architecture that comprises an exception controller supporting precise exceptions therein. The principles hereof reduce the complexity of circuit logic previously necessary to take an exception safely in a data processor supporting a clustered architecture. The present invention is well suited for implementation in data processors having multiple functional units that allow multiple operations to be explicitly executed in a single cycle, such as wide-issue (or "VLIW") processors. An exemplary implementation introduced hereafter illustrates that the principles hereof are extensible to wider issue processors—introducing a high degree of scalability.

According to one advantageous embodiment, each cluster of the data processor comprises an instruction execution pipeline having N processing stages. Each of the N processing stages is capable of performing at least one of a plurality of execution steps associated with instructions being executed by the clusters. The interrupt and exception controller operates to (i) monitor each instruction execution pipeline to detect exception conditions associated with the executing instructions, (ii) detect an exception condition associated with one of the executing instructions, wherein this executing instruction issued at time $t_0$, and (iii) generate an exception in response to the exception condition upon completed execution of earlier ones of the executing instructions, these earlier executing instructions issued at time preceding $t_0$.

An important aspect of this embodiment is that even if an exception is generated by some condition earlier in the instruction pipeline the instructions issued prior to the excepting instruction are allowed to complete. According to one related embodiment, the exception condition is detected while an execution step associated with the excepting instruction is performed by a processing stage preceding a Nth processing stage (which in a preferred embodiment is the write ("W") processing stage). In this manner, the exception may be deemed to occur when it reaches the Nth (or "W") processing stage of the pipeline, at which point the remaining pipeline can be aborted immediately and all subsequent instructions discarded. This is reflected in a related embodiment of the present invention wherein the interrupt and exception controller further operates to abort later executing instructions that issued at time subsequent $t_0$.

This mechanism allows exceptions to be serviced quickly and precisely, and is possible because it is inherently known whether a given instruction has architecturally executed at the point at which the exception occurs (Nth processing stage). As a result, no complex circuit logic is required, as is evident from a related embodiment of the present invention wherein the interrupt and exception controller further comprises exception generator circuitry and a plurality of latching circuits. The exception generator circuitry operates to generate the exception in response to the excepting instruction entering the "W" processing stage, and communicate the exception to fetch address generation circuitry, which operates, in response thereto, to fetch an instruction from an interrupt handler. The latching circuits control execution flow of the earlier executing instructions among associated processing stages, wherein ones of the latching circuits are associated with at least each of a "R" processing stage, an "E1" processing stage and an "E2" processing stage.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" and "circuitry" means any device, system or part thereof that controls at least one operation, such a device, system or part thereof may be implemented in hardware, firmware or software, or some combination of at least two of the same. It should be noted that the functionality associated with any particular controller or circuitry may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor supporting a clustered architecture.

Figure 1:
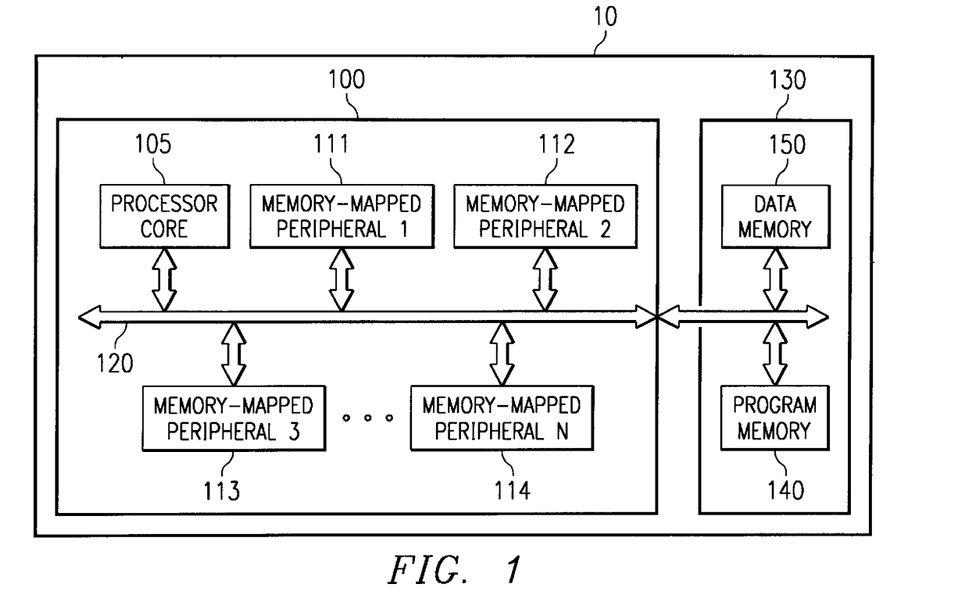
FIG. 1 illustrates a block diagram of a processing system that contains a data processor in accordance with the principles of the present invention.

FIG. 1 is a block diagram of processing system 10, which contains data processor 100 in accordance with the principles of the present invention. Data processor 100 comprises processor core 105 and N memory-mapped peripherals interconnected by system bus 120. The N memory-mapped peripherals include exemplary memory-mapped peripherals 111–114, which are arbitrarily labeled Memory-Mapped peripheral 1, Memory-Mapped Peripheral 2, Memory-Mapped Peripheral 3, and Memory-Mapped Peripheral N. Processing system 10 also comprises main memory 130. In an advantageous embodiment of the present invention, main memory 130 may be subdivided into program memory 140 and data memory 150.

The cost and complexity of data processor 100 is minimized by excluding from processor core 105 complex functions that may be implemented by one or more of memory-mapped peripherals 111–114. For example, memory-mapped peripheral 111 may be a video codec and memory-mapped peripheral 112 may be an audio codec. Similarly, memory-mapped peripheral 113 may be used to control cache flushing. The cost and complexity of data processor 100 is further minimized by implementing extremely simple exception behavior in processor core 105, as explained below in greater detail.

Processing system 10 is shown in a general level of detail because it is intended to represent any one of a wide variety of electronic devices, particularly consumer appliances. For example, processing system 10 may be a printer rendering system for use in a conventional laser printer. Processing system 10 also may represent selected portions of the video and audio compression-decompression circuitry of a video playback system, such as a video cassette recorder or a digital versatile disk (DVD) player. In another alternative embodiment, processing system 10 may comprise selected portions of a cable television set-top box or a stereo receiver. The memory-mapped peripherals and a simplified processor core reduce the cost of data processor 100 so that it may be used in such price sensitive consumer appliances.

In the illustrated embodiment, memory-mapped peripherals 111–114 are shown disposed within data processor 100 and program memory 140 and data memory 150 are shown external to data processor 100. It will be appreciated by those skilled in the art that this particular configuration is shown by way of illustration only and should not be construed so as to limit the scope of the present invention in any way. In alternative embodiments of the present invention, one or more of memory-mapped peripherals 111–114 may be externally coupled to data processor 100. Similarly, in another embodiment of the present invention, one or both of program memory 140 and data memory 150 may be disposed on-chip in data processor 100.

Figure 2:
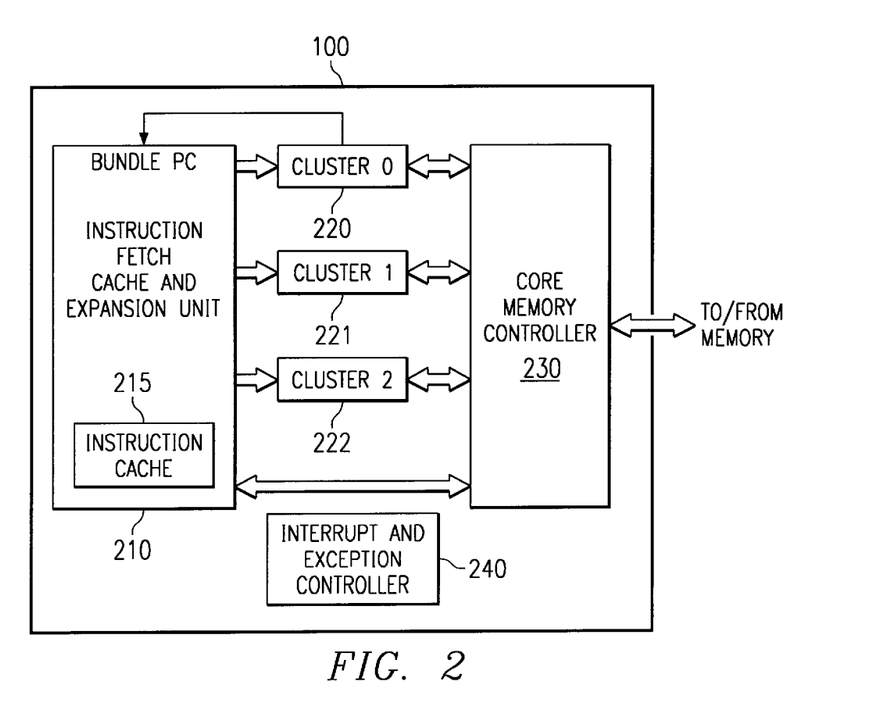
FIG. 2 illustrates a block diagram of the exemplary data processor in greater detail according to one embodiment of the present invention.

FIG. 2 is a more detailed block diagram of exemplary data processor 100 according to one embodiment of the present invention. Data processor 100 comprises instruction fetch cache and expansion unit (IFCEXU) 210, which contains instruction cache 215, and a plurality of clusters, including exemplary clusters 220–222. Exemplary clusters 220–222 are labeled Cluster 0, Cluster 1 and Cluster 2, respectively. Data processor 100 also comprises core memory controller 230 and an interrupt and exception controller 240.

A fundamental object of the design of data processor 100 is to exclude from the core of data processor 100 most of the functions that can be implemented using memory-mapped peripherals external to the core of data processor 100. By way of example, in an exemplary embodiment of the present invention, cache flushing may be efficiently accomplished using software in conjunction with a small memory-mapped device. Another object of the design of data processor 100 is to implement a statically scheduled instruction pipeline with an extremely simple exception behavior.

Clusters 220–222 are basic execution units that comprise one or more arithmetic units, a register file, an interface to core memory controller 230, including a data cache, and an inter-cluster communication interface. Because conventional processor cores can execute multiple simultaneously issued operations, the traditional word "instruction" is hereby defined with greater specificity. For the purposes of this disclosure, the following terminology is adopted. An "instruction" or "instruction bundle" is a group of simultaneously issued operations encoded as "instruction syllables". Each instruction syllable is encoded as a single machine word. Each of the operations constituting an instruction bundle may be encoded as one or more instruction syllables. Hereafter, the present disclosure may use the shortened forms "instruction" and "bundle" interchangeably and may use the shortened form "syllable." In an exemplary embodiment of the present invention, each instruction bundle consists of 1 to 4 instruction syllables. Flow control operations, such as branch or call, are encoded in single instruction syllables.

Exemplary interrupt and exception controller 240 operates to (i) monitor each instruction execution pipeline (discussed with reference to FIG. 4) to detect exception conditions associated with the executing instructions, (ii) detect an exception condition associated with one of the executing instructions when the executing instruction issues at time $t_0$, and (iii) generate an exception in response to the exception condition upon completed execution of earlier ones of the executing instructions, these earlier executing instructions issued at time preceding to. Thus, if an exception is generated by some condition earlier in the instruction pipeline the instructions issued prior to the excepting instruction are allowed to complete.

In the illustrated embodiment, interrupt and exception controller 240 is shown disposed within data processor 100. It will be appreciated by those skilled in the art that this particular configuration is shown by way of illustration only and should not be construed so as to limit the scope of the present invention in any way. In alternative embodiments of the present invention, all or a portion of interrupt and exception controller 240 may be externally associated with data processor 100.

Figure 3:
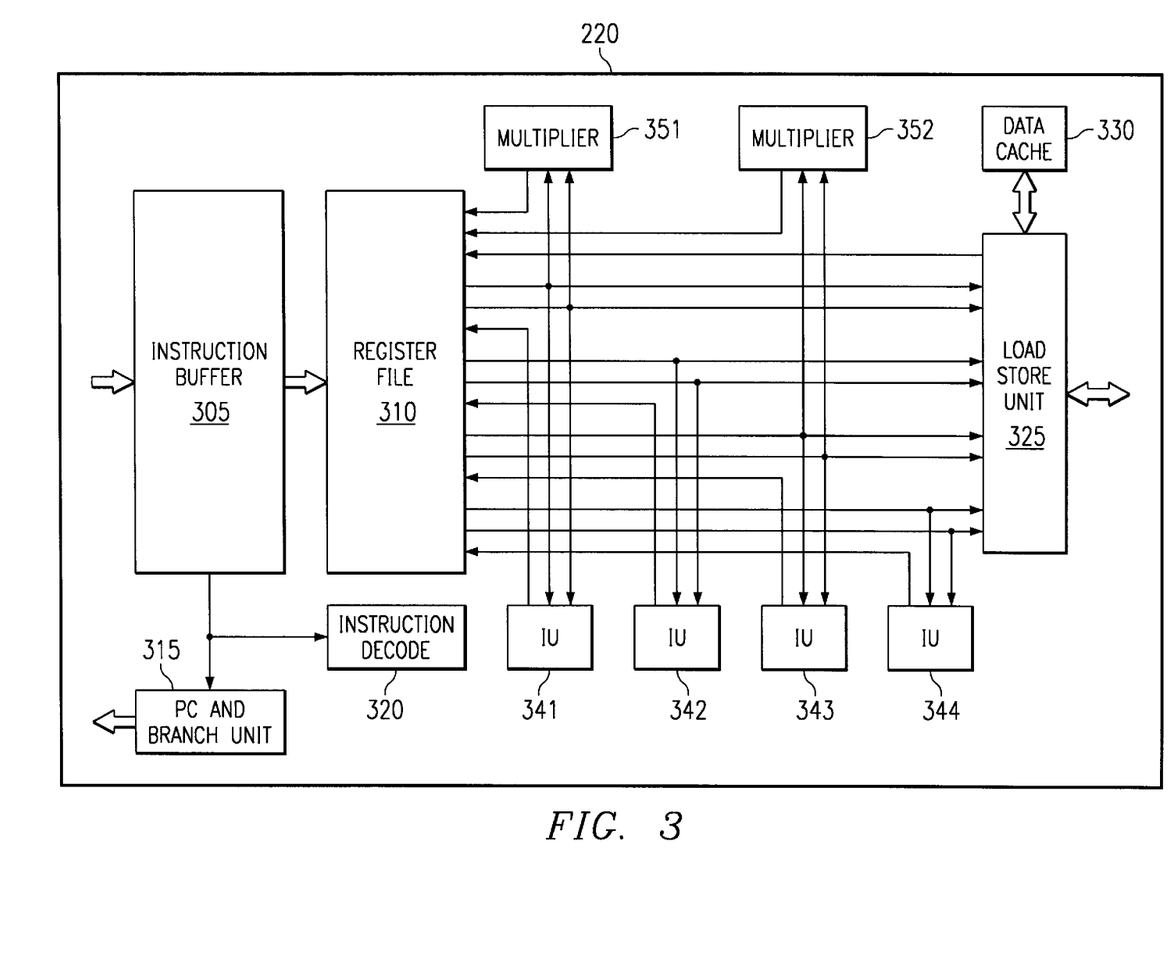
FIG. 3 illustrates a cluster in the exemplary data processor according to one embodiment of the present invention.

FIG. 3 is a more detailed block diagram of branching cluster 220 in data processor 100 according to one embodiment of the present invention. Branching cluster 220 comprises instruction buffer 305, register file 310, program counter and branch unit 315, instruction decoder 320, load store unit 325, data cache 330, integer units 341–344, and multipliers 351–352. Cluster 220 is implemented as an instruction pipeline.

Instructions are issued to an operand read stage associated with register file 310 and then propagated to the execution units (i.e., integer units 341–244, multipliers 351–352). Exemplary cluster 220 accepts one bundle comprising one to four syllables in each cycle. The bundle may consist of any combination of four integer operations, two multiplication operations, one memory operation (i.e., read or write) and one branch operation. Operations that require long immediates (constants) require two syllables.

In specifying a cluster, it is assumed that no instruction bits are used to associate operations with functional units. For example, arithmetic or load/store operations may be placed in any of the four words encoding the operations for a single cycle. This may require imposing some addressing alignment restrictions on multiply operations and long immediates (constants).

This following describes the architectural (programmer visible) status of the core of data processor 100. One design objective of data processor 100 is to minimize the architectural status. All non-user visible status information resides in a memory map, in order to reduce the number of special instructions required to access such information. While each of the clusters 220–222 is capable of computing branch conditions, only branching cluster 220 is operable to perform branch address computations.

Program Counter

In an exemplary embodiment of the present invention, the program counter (PC) in program counter and branch unit 315 is a 32-bit byte address pointing to the beginning of the current instruction bundle in memory. The two least significant bits (LSBS) of the program counter are always zero. In operations that assign a value to the program counter, the two LSBs of the assigned value are ignored.

Register File 310

In an exemplary embodiment, register file 310 contains 64 words of 32 bits each. Reading Register 0 (i.e., R0) always returns the value zero.

Link Register

Register 63 (i.e., R63) is used to address the link register by the call and return instructions. The link register (LR) is a slaved copy of the architecturally most recent update to R63. R63 can be used as a normal register, between call and return instructions. The link register is updated only by writes to R63 and the call instruction. At times the fact that the link register is a copy of R63 and not R63 itself may be visible to the programmer. This is because the link register and R63 get updated at different times in the pipeline. Typically, this occurs in the following cases:

1) ICALL and IGOTO instructions—Since these instructions are executed in the decode stage, these operations require that R63 be stable. Thus, R63 must not be modified in the instruction bundle preceding one of these operations. Otherwise unpredictable results may occur in the event of an interrupt; and 2) An interrupt or exception may update the link register incorrectly. Thus, all interrupt and exception handlers must explicitly write R63 prior to using the link register through the execution of an RFI, ICALL or IGOTO instruction. This requirement can be met with a simple MOV instruction from R63 to R63.

Branch Bit File

The branch architecture of data processor 100 uses a set of eight (8) branch bit registers (i.e., B0 through B7) that may be read or written independently. In an exemplary embodiment of the present invention, data processor 100 requires at least one instruction to be executed between writing a branch bit and using the result in a conditional branch operation.

Control Registers

A small number of memory mapped control registers are part of the architectural state of data processor 100. These registers include support for interrupts and exceptions, and memory protection.

The core of data processor 100 is implemented as a pipeline that requires minimal instruction decoding in the early pipeline stages. One design objective of the pipeline of data processor 100 is that it support precise interrupts and exceptions. Data processor 100 meets this objective by updating architecturally visible state information only during a single write stage. To accomplish this, data processor 100 makes extensive use of register bypassing circuitry to minimize the performance impact of meeting this requirement.

Figure 4:
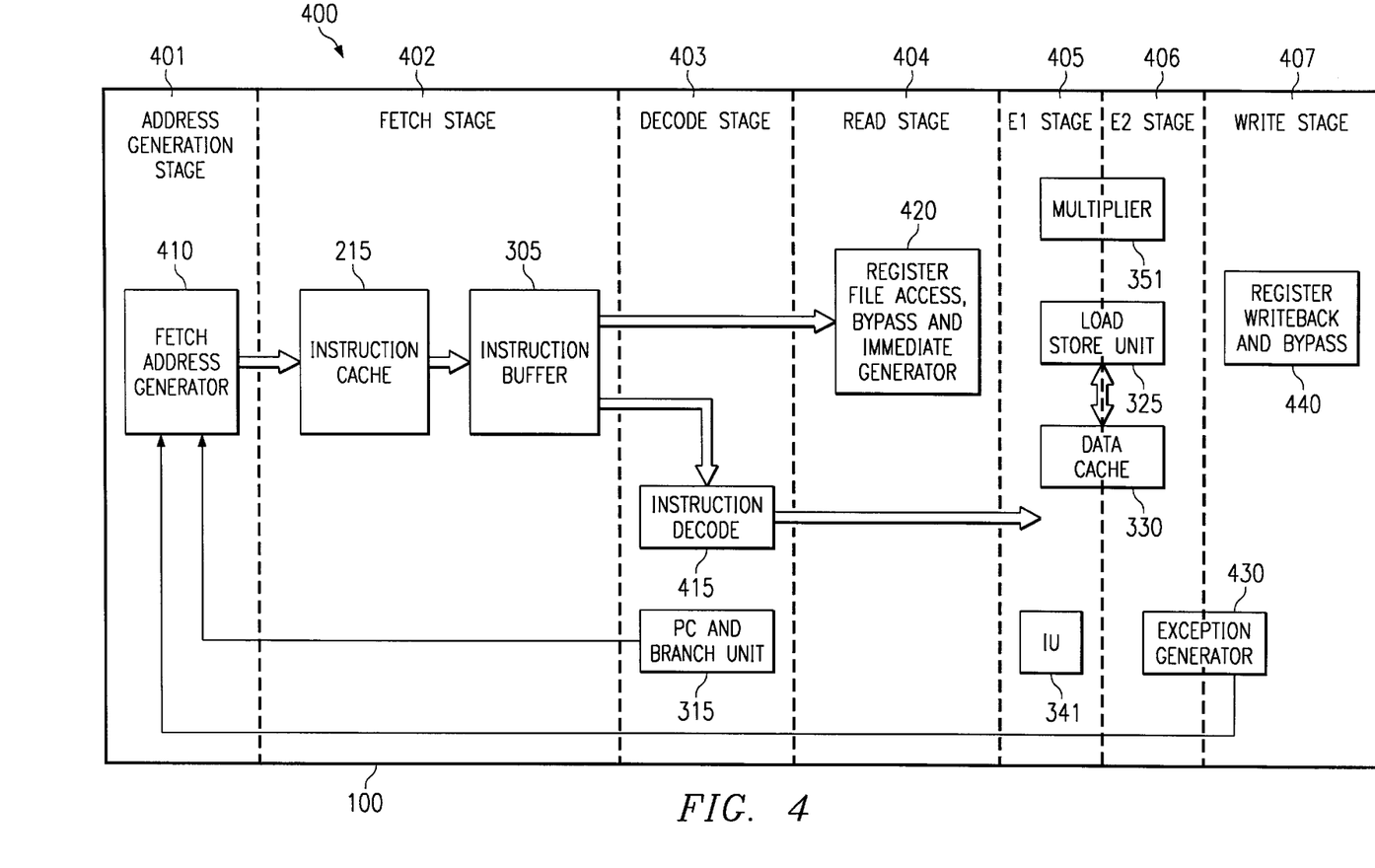
FIG. 4 illustrates the operational stages of the exemplary data processor according to one embodiment of the present invention.

FIG. 4 is a block diagram illustrating the operational stages of instruction execution pipeline 400 of exemplary data processor 100 according to one embodiment of the present invention. In the illustrated embodiment, the operational stages within instruction execution pipeline 400 of data processor 100 are address generation stage 401, fetch stage 402, decode stage 403, read stage 404, first execution (E1) stage 405, second execution (E2) stage 406 and write stage 407.

Address Generation Stage 401 and Fetch Stage 402

Address generation stage 401 comprises a fetch address generator 410 that generates the address of the next instruction to be fetched from instruction cache 215. Fetch address generator 410 receives inputs from exception generator 430 and program counter and branch unit 315. Fetch address generator 410 generates an instruction fetch address (FADDR) that is applied to instruction cache 215 in fetch stage 402 and to an instruction protection unit (not shown) that generates an exception if a protection violation is found. Any exception generated in fetch stage 402 is postponed to write stage 407. Instruction buffer 305 in fetch stage 402 receives instructions as 128-bit wide words from instruction cache 215 and the instructions are dispatched to the cluster.

Decode Stage 403

Decode stage 403 comprises instruction decode block 415 and program counter (PC) and branch unit 315. Instruction decode block 415 receives instructions from instruction buffer 305 and decodes the instructions into a group of control signals that applied to the execution units in E1 stage 405 and E2 stage 406. Program counter and branch unit 315 evaluates branches detected within the 128-bit wide words. A taken branch incurs a one cycle delay and the instruction being incorrectly fetched while the branch instruction is evaluated is discarded.

Read Stage 404

In read stage 404, operands are generated by register file access, bypass and immediate (constant) generation block 420. The sources for operands are the register files, the constants (immediates) assembled from the instruction bundle, and any results bypassed from operations in later stages in the instruction pipeline.

E1 Stage 405 and E2 Stage 406

The instruction execution phase of data processor 100 is implemented as two stages, E1 stage 405 and E2 stage 406 to allow two cycle cache access operations and two cycle multiplication operations. Exemplary multiplier 351 is illustrated straddling the boundary between E1 stage 405 and E2 stage 406 to indicate a two cycle multiplication operation. Similarly, load store unit 325 and data cache 330 are illustrated straddling the boundary between E1 stage 405 and E2 stage 406 to indicate a two cycle cache access operation. Integer operations are performed by integer units, such as IU 341 in E1 stage 405. Exceptions are generated by exception generator 430 in E2 stage 406 and write stage 407.

Results from fast operations are made available after E1 stage 405 through register bypassing operations. An important architectural requirement of data processor 100 is that if the results of an operation may be ready after E1 stage 405, then the results are always ready after E1 stage 405. In this manner, the visible latency of operations in data processor 100 is fixed.

Write Stage 407

At the start of write stage 407, any pending exceptions are raised and, if no exceptions are raised, results are written by register write back and bypass block 440 into the appropriate register file and/or data cache location. In data processor 100, write stage 407 is the "commit point" and operations reaching write stage 407 in the instruction pipeline and not "excepted" are considered completed. Previous stages (i.e., address generation, fetch, decode, read, E1, E2) are temporally prior to the commit point. Therefore, operations in address generation stage 401, fetch stage 402, decode stage 403, read stage 404, E1 stage 405 and E2 stage 406 are flushed when an exception occurs and are acted upon in write stage 407.

Load operations that transfer data from data cache 330 to the register files are performed in E1 stage 405, E2 stage 406, and write stage 406. Data shifting is performed early in write stage 407 prior to loading the data into the appropriate register file in register write back and bypass block 440. In order to maximize processor throughput, the present invention implements bypassing circuitry in the pipeline that permits data from load word operations to bypass the shifting circuitry in write stage 407.

Interrupt and Exception Controller 240

According to the illustrated embodiment, interrupt and exception controller 240 operates to (i) monitor each instruction execution pipeline, particularly processing stages 401–407 to detect exception conditions associated with the executing instructions, (ii) detect an exception condition associated with one of the executing instructions when the executing instruction issues at time to, and (iii) generate an exception in response to the exception condition upon completed execution of earlier ones of the executing instructions, these earlier executing instructions issued at time preceding $t_0$. Again, if an exception is generated by some condition earlier in the instruction pipeline the instructions issued prior to the excepting instruction are allowed to complete.

Figure 5:
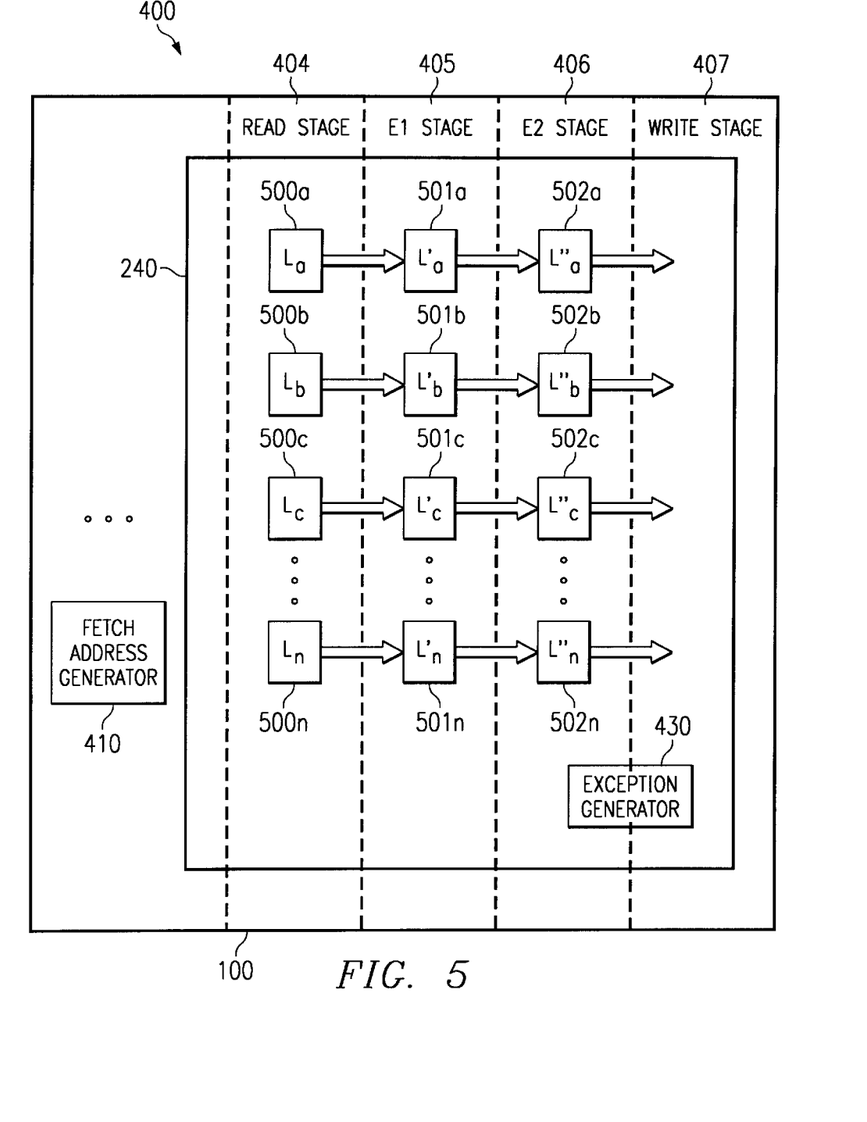
FIG. 5 illustrates a high-level block diagram of an interrupt and exception controller implemented in conjunction with select operational stages of the exemplary data processor according to one embodiment of the present invention.

FIG. 5 illustrates a high-level block diagram of a portion of exemplary interrupt and exception controller 240 implemented in conjunction with select operational stages (e.g., read stage 404, E1 stage 405, E2 stage 406, write stage 407) of exemplary data processor 100 according to one embodiment of the present invention. Interrupt and exception controller 240 illustratively comprises exception generator circuitry 430 and a plurality of latching circuits 500a–502n.

Exemplary exception generator circuitry 430 operates to generate exceptions in response to excepting instructions entering "W", processing stage 407, and to communicate the exceptions upon their occurrence to fetch address generation circuitry 410. Exemplary fetch address generation circuitry 410 operates to fetch an instruction from an interrupt handler.

Again, each cluster 200–202 of data processor 100 comprises an instruction execution pipeline 400 having seven processing stages 401–407. Each of the seven processing stages 401–407 is capable of performing at least one of a plurality of execution steps associated with instructions being executed by clusters 200–202. Interrupt and exception controller 240 operates to (i) monitor each instruction execution pipeline 400 to detect exception conditions associated with the executing instructions, (ii) detect an exception condition associated with one of the executing instructions, wherein the executing instruction is issued at time $t_0$, and (iii) generate an exception in response to the exception condition upon completed execution of earlier ones of the executing instructions, these earlier executing instructions issued at time preceding $t_0$.

Exemplary latching circuits 500a–502n control execution flow of the earlier executing instructions among associated processing stages, wherein ones of the latching circuits are illustratively associated with at least each of "R" processing stage 404, "E1" processing stage 405 and "E2" processing stage 406. Therefore, if an exception is generated by some condition earlier in instruction pipeline 400, instructions issued prior to the excepting instruction are allowed to complete.

For instance, if the exception condition is detected while an execution step associated with the excepting instruction is performed by a processing stage 401–406 preceding "W" processing stage 407, then the exception is deemed to occur only when the excepting instruction reaches "W" processing stage 407 of pipeline 400, at which point the remaining pipeline stages 401–406 can be aborted immediately and all subsequent instructions discarded. Interrupt and exception controller 240 accordingly operates to abort later executing instructions that issued at a time subsequent $t_0$.

It will be appreciated by those skilled in the art that exception conditions can be generated from a number of sources within the processor core. According to this embodiment, if an exception condition, which indicates that an exception has occurred, is valid at "W" processing stage 407 of pipeline 400 an exception is generated thereby ensuring a precise exception model. On exception generation, pipeline 400 is flushed and some state saved to allow interrupt and exception controller 240 to determine a cause of the exception and possible recovery. Instructions that except do not modify any architectural state other than that defined for exception handling.

TABLE 1

| | |
|---|---|
| PC = SAVED_PC | Restore the PC that the exception occurred at. Note that the SAVED_PC can be altered during the exception handler routine. This might be done to allow a User mode handler routine to be called. |
| PSW = SAVED_PSW | Restore the previous machine state. Note that a SAVED_PSW register can be altered during the exception handler routine. It should also be noted that a rfi instruction and a store instruction to the PSW should not happen in the same bundle. |

TABLE 2 below illustrates exemplary exceptions and a bit number associated with the same in a EXCEPT_CAUSE control register associated with interrupt and exception controller 240. Again, it will be appreciated by those skilled in the art that a desired behavior is for only one exception to be raised at a time, and, as such, there are priorities enforced if there are simultaneous exceptions. The entries in TABLE 2 are listed in exception priority starting with the highest priority.

TABLE 2

| | | | |
|---|---|---|---|
| EXTERN_INT | 0 | External Interrupt | An external interrupt. |
| IBREAK | 1 | Instruction Protection Unit | A breakpoint triggered on instruction address. |
| IPU_NO_TRANSLATION | 2 | Instruction Protection Unit | No mapping in the IPU for the given address. |
| IPU_ACCESS_VIOLATION | 3 | Instruction Protection Unit | Permission to access an address controlled by the IPU was not met. |
| ILL_INST | 4 | Pipeline Control and Control Registers | An instruction could not be decoded into a legal instruction or a privileged instruction is being issued in user mode. |
| DBREAK | 5 | Data Protection Unit | A breakpoint triggered on a data address. |
| MISALIGNED_TRAP | 6 | Load Store Unit | An address is misaligned and misaligned accesses are not supported. |
| CREG_NO-MAPPING | 7 | Control Registers | The load or store address was in control register space, but there does not exist a control register at the exact address. |
| CREG_ACCESS_VIOLATION | 8 | Control Registers | A store to control register space was attempted whilst in User mode. |
| DPU_NO_TRANSLATION | 9 | Data Protection Unit | There was no mapping in the DPU for the given address. |
| DPU_ACCESS_VIOLATION | 10 | Data Protection Unit | Permission to access an address controlled by the Data Protection Unit was not met. |

According to the present embodiment, a legal instruction bundle and all syllables contained therein preferably conforms to the following:

1. Instruction syllables decode to a valid instruction.
2. Instruction bundles include a valid stop bit, i.e., four zero stop bits is illegal.
3. Unused opcode fields are set to zero.
4. Any branch/call operation appears as a first instruction syllable of an instruction bundle.
5. Multiply operations appear at odd memory addresses.
6. Long immediate extensions appear at even memory addresses.
7. Immediate extension association is to an opcode that has an immediate format and appears in the same instruction bundle.
8. A privileged instruction can only be completed in supervisor mode.
9. Destination branch and integer registers in an instruction bundle are unique, with the exception of R0.
10. One memory operation is performed in each instruction bundle.

In contrast, an illegal instruction is caused when an illegal bundle is encountered at "W" processing stage 407 of execution.

In related embodiments, (i) select control registers are used to set up values at the time of an exception for use by exception handler routines; (ii) pipeline 400 is flushed by invalidating all operations in each pipeline stage 401–406.

Although the present invention has been described in detail, those skilled in the art should understand that they can make various changes, substitutions and alterations herein without departing from the spirit and scope of the invention in its broadest form.

What is claimed is:

1. A data processor having a plurality of clusters, each said cluster comprising an instruction execution pipeline, each said instruction execution pipeline comprising N processing stages, where N is a positive, non-zero integer, each of said N processing stages capable of performing at least one of a plurality of execution steps associated with instructions being executed by said clusters, said data processor comprising:

an interrupt and exception controller that (i) detects an exception condition associated with one of said executing instructions, said one of said executing instructions issued at time $t_0$, and (ii) generates an exception in response to said exception condition upon completed execution, within each of said clusters, of earlier ones of said executing instructions, said earlier ones of said executing instructions issued at time preceding $t_0$.

2. The data processor as set forth in claim 1 wherein said exception condition is detected while an execution step associated with said one of said executing instructions is performed by a processing stage preceding a Nth processing stage.

3. The data processor as set forth in claim 1 wherein said exception condition is detected while an execution step associated with said one of said executing instructions is performed by a processing stage preceding a write ("W") processing stage.

4. The data processor as set forth in claim 1 wherein said interrupt and exception controller further operates to monitor each said instruction execution pipeline to detect exception conditions associated with said executing instructions.

5. The data processor as set forth in claim 1 wherein said interrupt and exception controller further operates to abort later ones of said executing instructions, said later ones of said executing instructions issued at time subsequent $t_o$.

6. The data processor as set forth in claim 5 wherein said exception condition associated with said one of said executing instructions is detected during one of a read ("R") processing stage, a first execution("E1") processing stage and a second execution("E2") processing stage.

7. The data processor as set forth in claim 1 wherein said interrupt and exception controller comprises exception generator circuitry that generates said exception in response to said one of said executing instructions entering a write ("W") processing stage.

8. The data processor as set forth in claim 7 wherein said exception generator circuitry communicates said exception to fetch address generation circuitry, said fetch address generation circuitry, in response to said exception, fetching an instruction of an interrupt handler.

9. The data processor as set forth in claim 1 wherein said interrupt and exception controller comprises a plurality of latching circuits, at least one of said latching circuits associated with each of a read ("R") processing stage, a first execution("E1") processing stage and a second execution ("E2") processing stage, said latching circuits control execution flow of said earlier ones of said executing instructions among associated processing stages.

10. For use in a data processor having a clustered architecture, said data processor comprising a plurality of clusters, each said cluster comprising an instruction execution pipeline, each said instruction execution pipeline comprising N processing stages, where N is a positive, non-zero integer, each of said N processing stages capable of performing at least one of a plurality of execution steps associated with instructions being executed by said clusters, a method of operating said data processor comprising the steps of:

monitoring each said instruction execution pipeline to detect exception conditions associated with said executing instructions;

detecting an exception condition associated with one of said executing instructions, said one of said executing instructions issued at time $t_0$; and generating an exception in response to said exception condition upon completed execution, within each of said clusters, of earlier ones of said executing instructions, said earlier ones of said executing instructions issued at time preceding $t_0$.

11. The method of operating said data processor as set forth in claim 10 wherein said detecting step further comprises the step of performing an execution step associated with said one of said executing instructions by a processing stage preceding a write ("W") processing stage.

12. The method of operating said data processor as set forth in claim 10 further comprising the step of aborting later ones of said executing instructions, said later ones of said executing instructions issued at time subsequent $t_0$.

13. The method of operating said data processor as set forth in claim 10 wherein said detecting step is performed during one of a read ("R") processing stage, a first execution ("E1") processing stage and a second execution("E2") processing stage.

14. The method of operating said data processor as set forth in claim 10 further comprising the steps of:

generating said exception in response to said one of said executing instructions entering a write ("W") processing stage; and fetching, in response to said exception, an instruction of an interrupt handler.

15. The method of operating said data processor as set forth in claim 10 wherein said data processor further comprises a plurality of latching circuits, at least one of said latching circuits associated with each of a read ("R") processing stage, a first execution("E1") processing stage and a second execution("E2") processing stage, and said method of operating said data processor further comprising the step of controlling execution flow of said earlier ones of said executing instructions among associated processing stages using said latching circuits.

16. A processing system comprising:

a data processor having a clustered architecture;

a memory associated with said data processor;

a plurality of peripheral circuits associated with said data processor for performing selected functions in association with said data processor, wherein said data processor comprises:

an instruction cache;

a plurality of clusters, each said cluster comprising an instruction execution pipeline, each said instruction execution pipeline comprising N processing stages, where N is a positive, non-zero integer, each of said N processing stages capable of performing at least one of a plurality of execution steps associated with instructions being executed by said clusters; and an interrupt and exception controller that (i) detects an exception condition associated with one of said executing instructions, said one of said executing instructions issued at time $t_0$, and (ii) generates an exception in response to said exception condition upon completed execution, within each of said clusters, of earlier ones of said executing instructions, said earlier ones of said executing instructions issued at time preceding $t_0$.

17. The processing system as set forth in claim 16 wherein said exception condition is detected while an execution step associated with said one of said executing instructions is performed by a processing stage preceding a Nth processing stage.

18. The processing system as set forth in claim 16 wherein said exception condition is detected while an execution step associated with said one of said executing instructions is performed by a processing stage preceding a write ("W") processing stage.

19. The processing system as set forth in claim 16 wherein said interrupt and exception controller further operates to monitor each said instruction execution pipeline to detect exception conditions associated with said executing instructions.

20. The processing system as set forth in claim 16 wherein said interrupt and exception controller further operates to abort later ones of said executing instructions, said later ones of said executing instructions issued at time subsequent $t_0$.

21. The processing system as set forth in claim 20 wherein said exception condition associated with said one of said executing instructions is detected during one of a read ("R") processing stage, a first execution ("E1") processing stage and a second execution("E2") processing stage.

22. The processing system as set forth in claim 16 wherein said interrupt and exception controller comprises exception generator circuitry that generates said exception in response to said one of said executing instructions entering a write ("W") processing stage.

23. The processing system as set forth in claim 22 wherein said exception generator circuitry communicates said exception to fetch address generation circuitry, said fetch address generation circuitry, in response to said exception, fetching an instruction of an interrupt handler.

24. The processing system as set forth in claim 16 wherein said interrupt and exception controller comprises a plurality of latching circuits, at least one of said latching circuits associated with each of a read ("R") processing stage, a first execution("E1") processing stage and a second execution ("E2") processing stage, said latching circuits control execution flow of said earlier ones of said executing instructions among associated processing stages.

\* \* \* \* \*